(12) United States Patent
Wang

(10) Patent No.: US 7,753,572 B2
(45) Date of Patent: Jul. 13, 2010

(54) ILLUMINATING DEVICE INSTALLED ON A TRUCK'S WHEELS

(76) Inventor: Ming-Cheng Wang, P.O. Box 90, Tainan City 70499 (TW)

( * ) Notice: Subject to any disclaimer, the term of this patent is extended or adjusted under 35 U.S.C. 154(b) by 217 days.

(21) Appl. No.: 12/174,647

(22) Filed: Jul. 17, 2008

(65) Prior Publication Data
US 2010/0014303 A1    Jan. 21, 2010

(51) Int. Cl.
*B60Q 1/00* (2006.01)
(52) U.S. Cl. .................. 362/500; 362/42; 362/806; 40/587
(58) Field of Classification Search ............. 362/42, 362/500, 800, 806; 40/587
See application file for complete search history.

(56) References Cited
U.S. PATENT DOCUMENTS 4,775,919 A  * 10/1988 Pearsall et al. ............... 362/500
5,497,302 A  * 3/1996 O'Donnell ................... 362/500
7,048,421 B1 * 5/2006 Allen-Atkins ............... 362/500
7,611,267 B2 * 11/2009 Cooper ........................ 362/500

* cited by examiner

*Primary Examiner*—Hargobind S Sawhney

(57) ABSTRACT

An illuminating device installed on a truck's wheels includes a hubcap having a positioning base and at least one fixing base. The positioning base is provided with a chamber and two notches formed in its one side wall. The fixing base has a recess, a through hole bored in the recess to communicate with an outside of the hubcap, and two recessed slot. A generator is fixed at an inside center of the hubcap, provided with two conducting blades extending into the chamber of the positioning base. At least a light is fitted in the through hole of the hubcap and connected with the conducting blades by conducting lines. By means of rotation or vibration of the wheels, the generator can create electromotive force to supply the light with power to make rotary brilliant brightness so as to achieve a warning effect for traffic security.

5 Claims, 6 Drawing Sheets

ILLUMINATING DEVICE INSTALLED ON A TRUCK'S WHEELS

BACKGROUND OF THE INVENTION

1. Field of the Invention

This invention relates to an illuminating device installed on a truck's wheels, particularly to one able to automatically project brilliant light to achieve a warning effect for traffic security while rotating.

2. Description of the Prior Art

Commonly, hubcaps nowadays installed on a truck's wheels are just shaped with a convex inanimate surface, used as nothing but a protector for the wheels. In order to enable the hubcaps to brighten at night for secure warning, they are always attached with glow-in-dark films so as to achieve an effect of rotary brightening. However, such glow-in-dark films may easily peel off to make the wheels unaesthetic, and they can only restrictively emit brightness.

SUMMARY OF THE INVENTION

The object of this invention is to offer an illuminating device installed on a truck's wheels so that it can automatically project brilliant light to achieve a warning effect for traffic security while whirling.

The main characteristics of the invention are a hubcap, a generator and at least a light. The hubcap is provided with a positioning base and at least one fixing base. The positioning base is provided with a chamber and at least a notch formed in its one sidewall. The fixing base is provided with a recess, a through hole bored in the recess to communicate with an outside of the hubcap, and two recessed slots symmetrically cut in its wall. A generator is fixed at an inside center of the hubcap, provided with two conducting blades extending into the chamber of the positioning base. At least a light is fitted in the through hole of the hubcap and connected with the conducting blades by two conducting lines.

BRIEF DESCRIPTION OF DRAWINGS

This invention is better understood by referring to the accompanying drawings, wherein.

DETAILED DESCRIPTION OF THE PREFERRED EMBODIMENT

Figure 1:
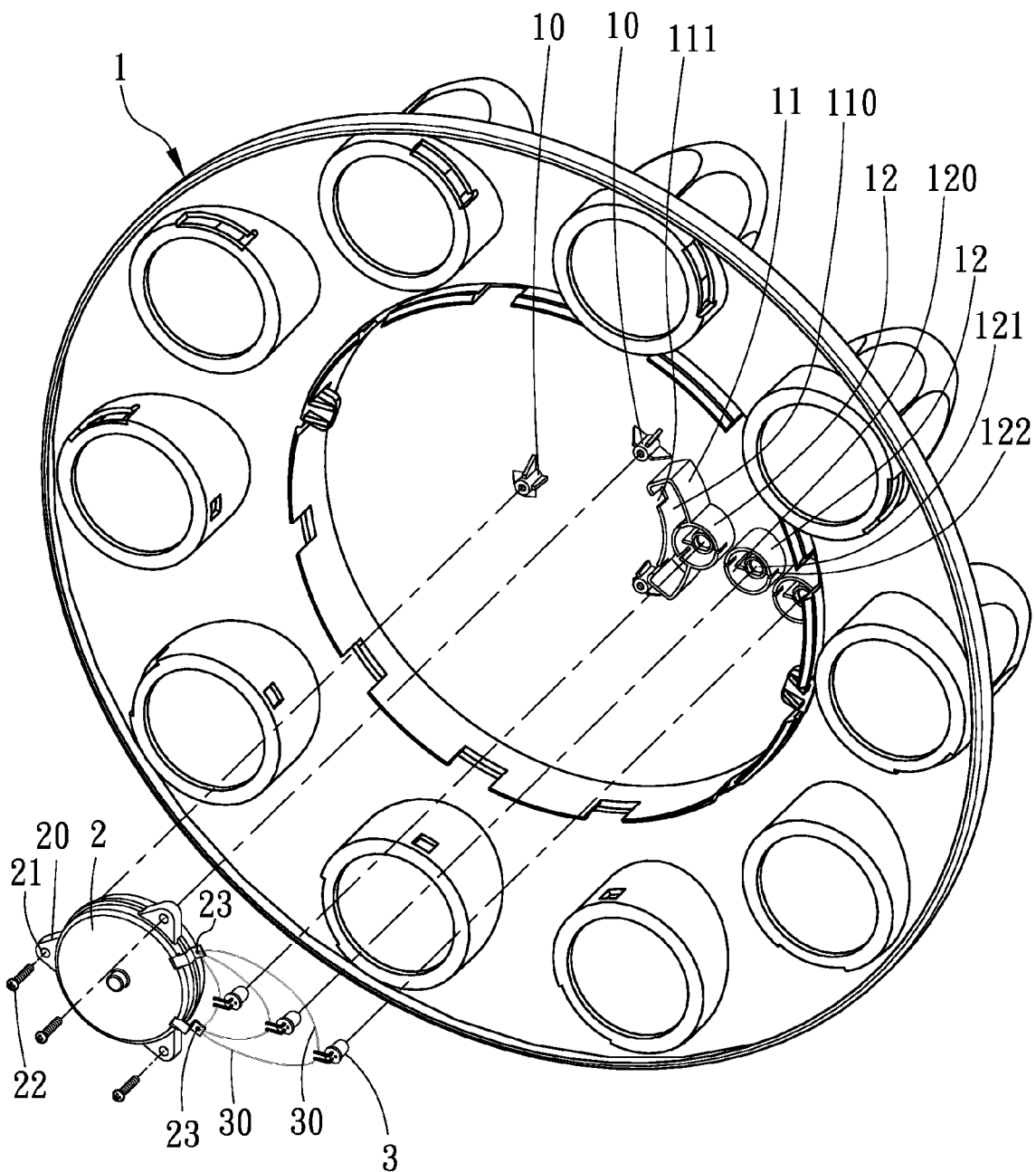
FIG. 1 is an exploded perspective view of a first preferred embodiment of an illuminating device installed on a truck's wheels in the present invention.
Figure 2:
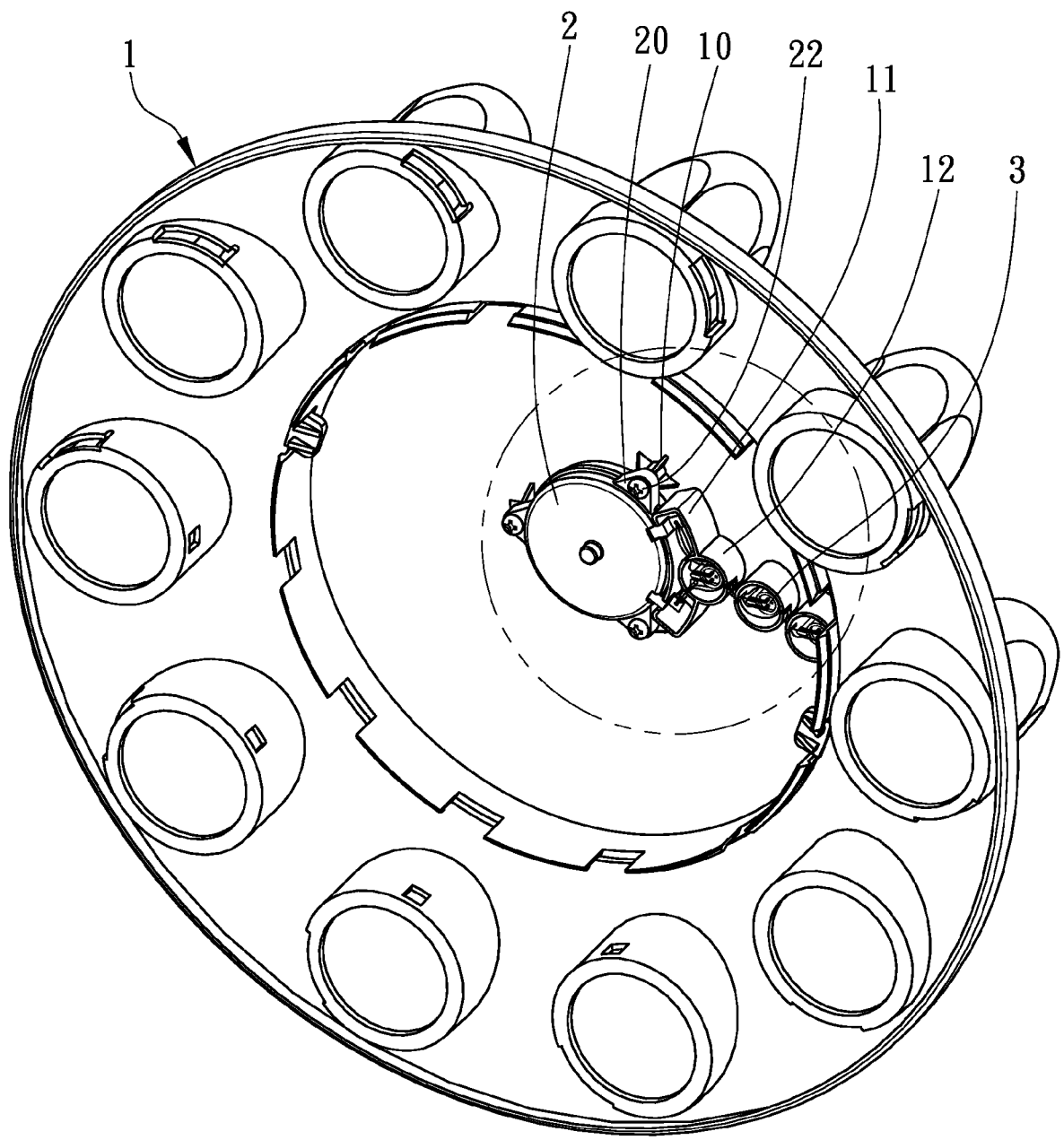
FIG. 2 is a perspective view of the first preferred embodiment of an illuminating device installed on a truck's wheels in the present invention.
Figure 3:
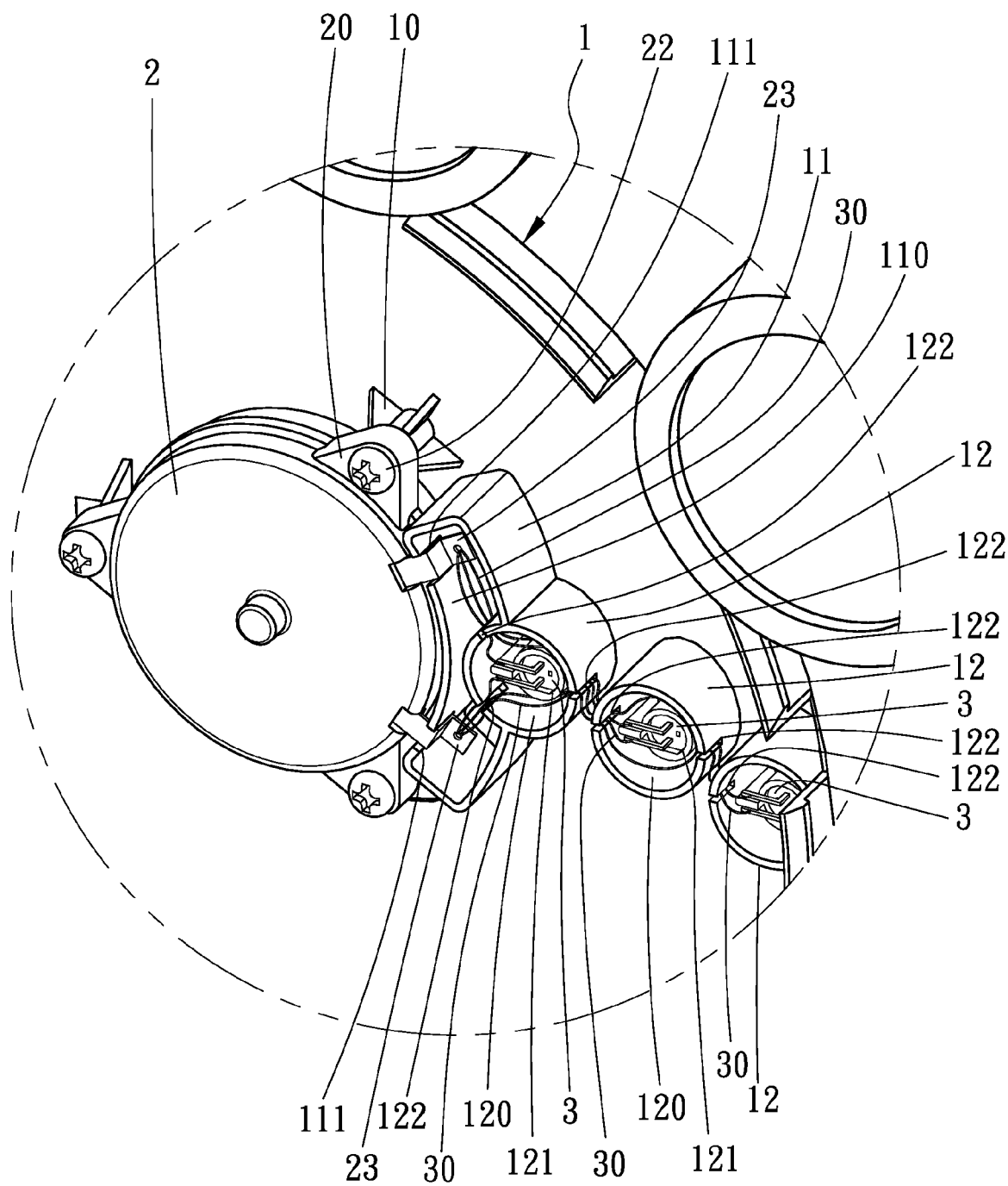
FIG. 3 is a partial magnified perspective view of the first preferred embodiment of an illuminating device installed on a truck's wheels in the present invention.

As shown in FIGS. 1~3, a first preferred embodiment of an illuminating device installed on a truck's wheels in the present invention includes a hubcap 1, a generator 2 and plural lights 3 (LED).

The hubcap 1 is provided with a plurality of positioning bars 10, a positioning base 11 and plural fixing bases 12 formed on its inside. The positioning base 11 is provided with a chamber 110, and two notches 111 formed in its one sidewall. One of the fixing bases 12 is combined in the other sidewall of the positioning base 11. Each of the fixing bases 12 is provided with a recess 120, a through hole 121 bored in the recess 120 to communicate with the outside of the hubcap 1, and two recessed slot 122 symmetrically cut in its wall.

The generator 2 being a rotary generator or a vibrating generator is centrally fixed on the inside of the hubcap 1, provided with plural fixing ears 20 respectively having a through hole 21 for being inserted through by a screw 22, and two conducting blades 23.

Each of the lights 3 is fitted in the through hole 121 of the hubcap 1 and connected with the conducting blades 23 by two conducting lines 30.

In assembly, as shown in FIGS. 1~3, the screws 22 are first extended through the through holes 21 of the generator 2 and then threadably fixed in the positioning bars 10 of the hubcap 1.

Figure 4:
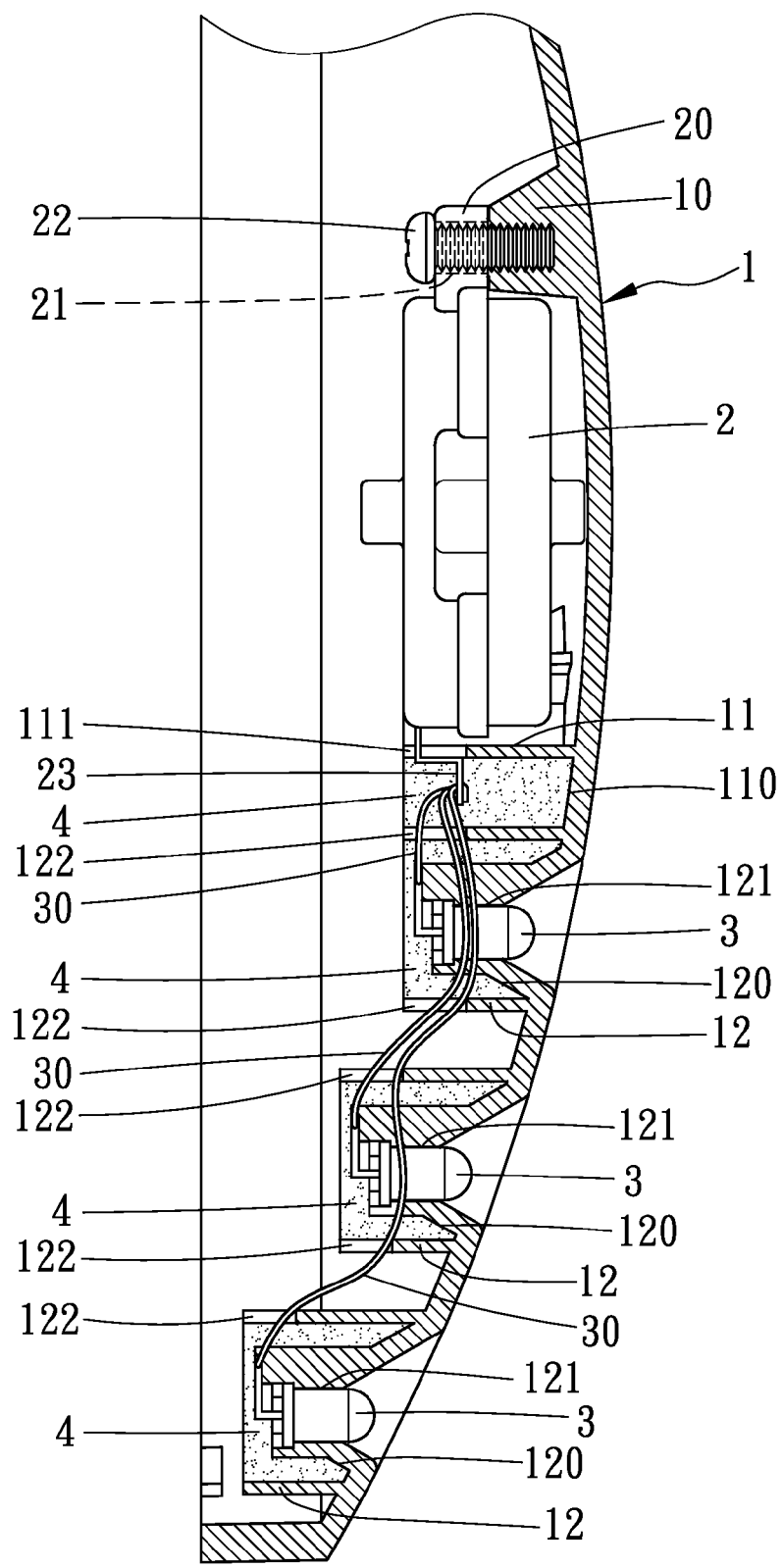
FIG. 4 is a cross-sectional view of the first preferred embodiment of an illuminating device installed on a truck's wheels in the present invention.

By means of the screws 22 first extended through the through holes 21 of the generator 2 and then threadably fixed in the positioning bars 10 of the hubcap 1, the generator 2 is installed on the inside of the hubcap 1, with the conducting blades 23 fitted in the notches 111 of the positioning base 11 respectively in the chamber 110. Next, the lights 3 (LEDs) are fitted in the through holes 121 of the fixing bases 12 respectively, and the conducting lines 30 are orderly fitted in the recesses slots 122 of the fixing bases 12 and connected to the conducting blades 23 of the generator 2. Then the chamber 110 of the positioning base 11 and the recesses 120 of the fixing bases 12 are molded with water-proof silicone rubber (shown in FIG. 4), so that the lights 3 (LED) can be immovably positioned in the recesses 120 of the fixing bases 12 and the conducting lines 23 of the generator 2 can be wrapped with a water-proof layer. The assembly of the illuminating device of the invention is thus finished.

Figure 5:
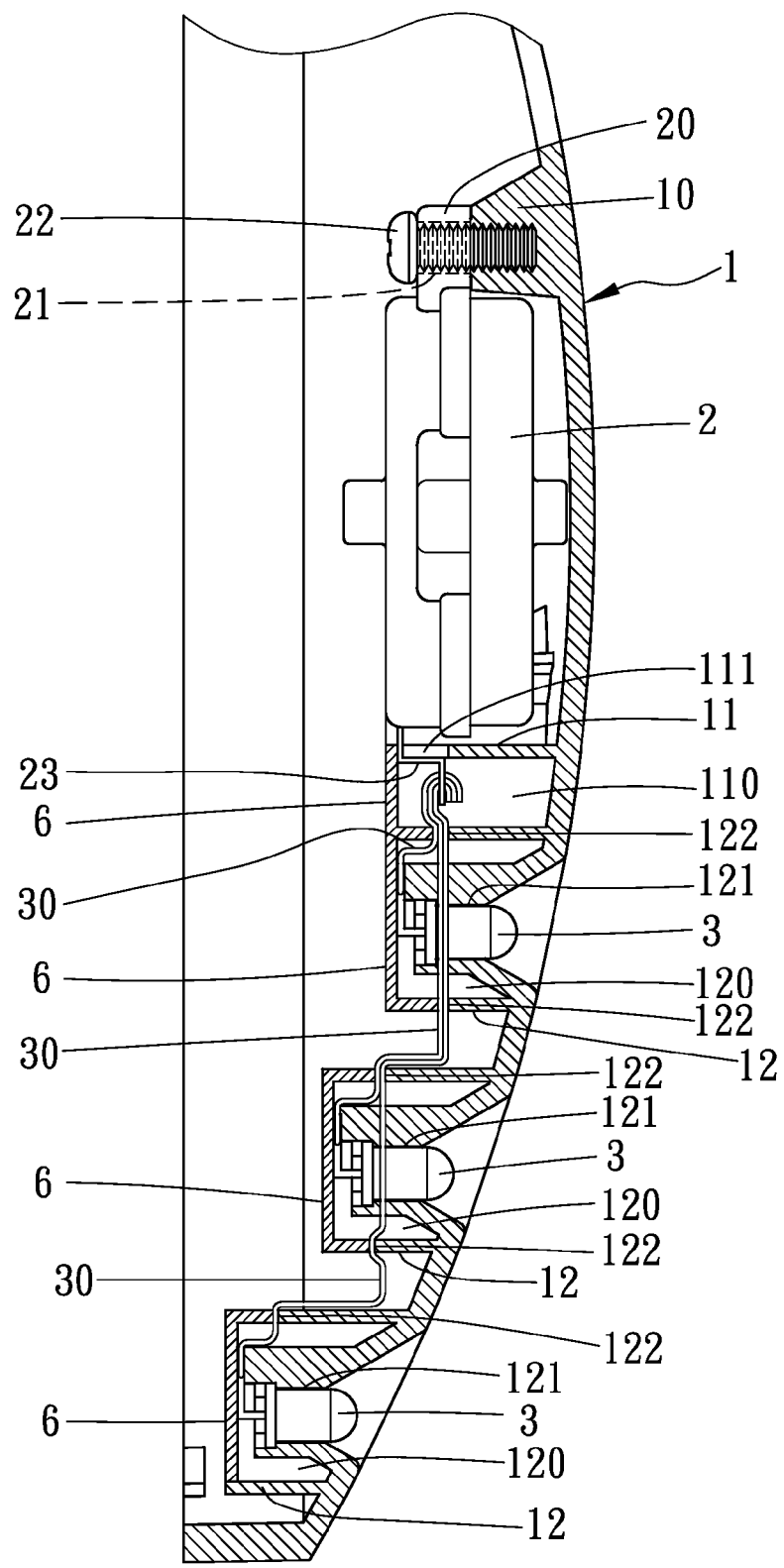
FIG. 5 is a cross-sectional view of a second preferred embodiment of an illuminating device installed on a truck's wheels in the present invention.

As shown in FIG. 5, a second preferred embodiment of an illuminating device installed on a truck's wheels in the present invention has the same components as the first one does, except that a water-proof cover 6 is additionally installed on the chamber 110 of the positioning base 11 and the recesses 120 of the fixing bases 12 respectively. The water-proof covers 6 are then welded together with the positioning base 11 and the fixing bases 12 respectively by ultrasonic welding process.

Figure 6:
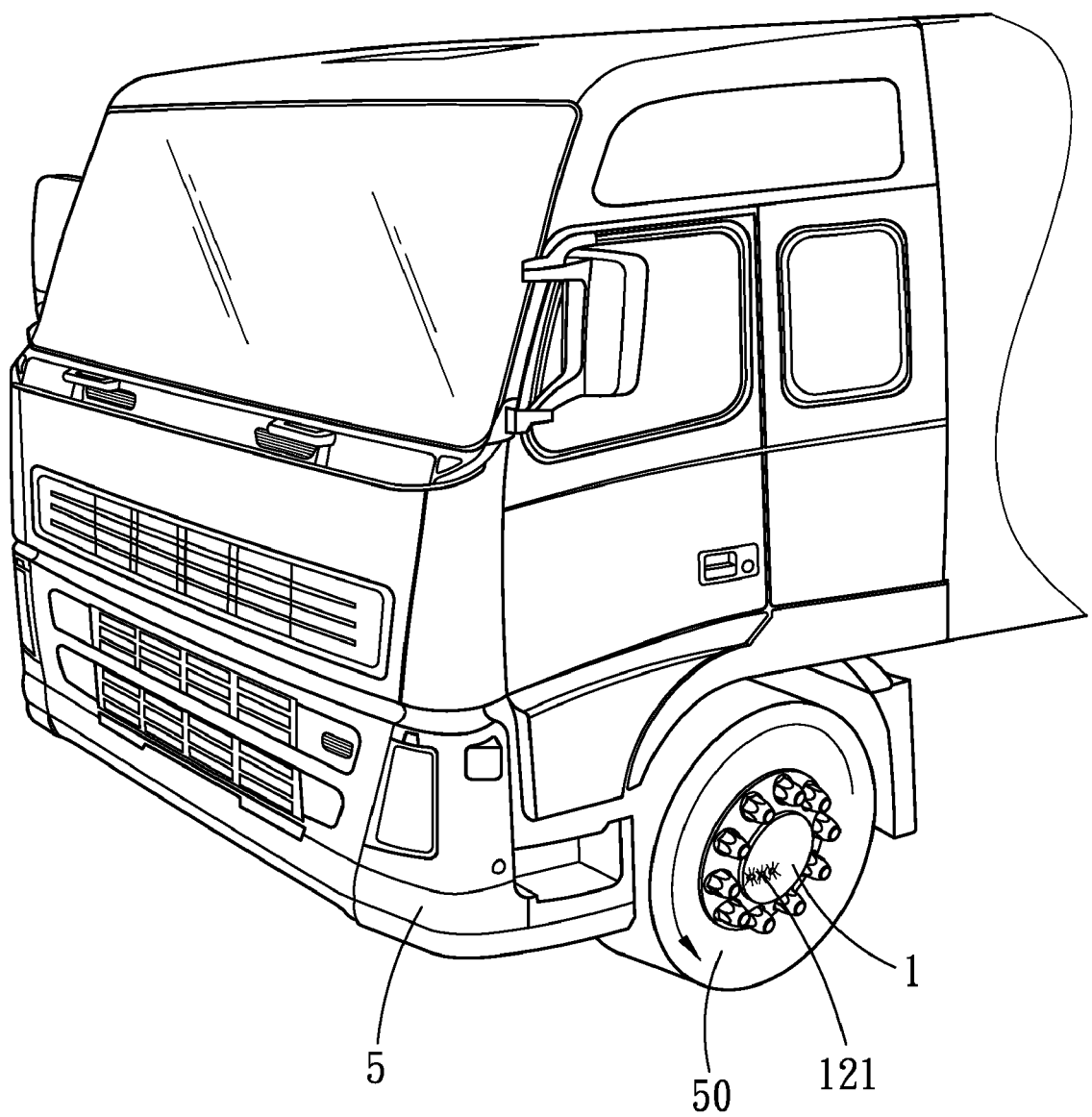
FIG. 6 is a schematic perspective view of the present invention, showing it being installed on a truck's wheel.

In using, as shown in FIG. 6, when the hubcap 1 is fixed on a running wheel 50 of a truck 5, the generator 2 is to create induced electromotive force to supply the lights 3 (LEDs) with power owing to rotation or vibration of the wheel 50. The lights 3 (LED) will then start brightening and shooting out from the through holes 121 of the hubcap 1, creating aesthetic brilliant rotary light to achieve a warning purpose for traffic security. Moreover, with the lights 3 and the conducting blades 23 of the generator 2 molded with the water-proof silicone rubber 4, the lights 3 can lower failure rate to prolong their service life.

While the preferred embodiment of the invention has been described above, it will be recognized and understood that various modifications may be made therein and the appended claims are intended to cover all such modifications that may fall within the spirit and scope of the invention.

What is claimed is:

1. An illuminating device installed on a truck's wheels, said illuminating device comprising a hubcap provided with a positioning base and at least one fixing base, said positioning base provided with a chamber and at least a notch formed in its one side wall, said fixing base provided with a recess and a through hole bored in said recess to communicate with an outside of said hubcap, two recessed slot symmetrically formed in a wall of said fixing base, a generator fixed at an inside center of said hubcap and provided with two conducting blades extending into said chamber of said positioning base, at least a light fitted in said through hole of said hubcap and provided with two conducting lines connected with said conducting blades.

2. The illuminating device installed on a truck's wheels as claimed in claim 1, wherein said hubcap is provided with a plurality of positioning bars formed on its inside and said generator is provided with plural fixing ears respectively bored with a through hole for a screw to pass through so as to keep said generator positioned at said inside center of said hubcap.

3. The illuminating device installed on a truck's wheels as claimed in claim 1, wherein one of said fixing bases is combined in a sidewall of said positioning base.

4. The illuminating device installed on a truck's wheels as claimed in claim 1, wherein said chamber of said positioning base and said recess of said fixing base are molded with water-proof silicone rubber.

5. The illuminating device installed on a truck's wheels as claimed in claim 1, wherein said chamber of said positioning base and said recess of said fixing base are respectively sealed with a water-proof cover.

* * * * *